(12) United States Patent
Matherson et al.

(10) Patent No.: US 7,266,248 B2
(45) Date of Patent: Sep. 4, 2007

(54) METHOD AND APPARATUS FOR GENERATING DATA REPRESENTATIVE OF AN IMAGE

(75) Inventors: Kevin J. Matherson, Fort Collins, CO (US); Andrew C. Goris, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 838 days.

(21) Appl. No.: 10/637,956

(22) Filed: Aug. 8, 2003

(65) Prior Publication Data

US 2005/0030409 A1 Feb. 10, 2005

(51) Int. Cl.
*G06K 9/40* (2006.01)
*H04N 5/232* (2006.01)
*G01B 9/04* (2006.01)
(52) U.S. Cl. .................... 382/255; 348/345; 250/201.8
(58) Field of Classification Search ................ 382/255, 382/274, 275, 294, 296, 312; 348/208.6, 348/241, 335, 345; 250/201.7, 201.8, 208.1
See application file for complete search history.

(56) References Cited

U.S. PATENT DOCUMENTS

| 5,552,594 | A | * | 9/1996 | Vandenberg et al. | ..... 250/201.7 |
| 5,646,394 | A | * | 7/1997 | Steinle et al. | ............ 250/208.1 |
| 5,650,607 | A | * | 7/1997 | Kusaka | .................... 250/201.8 |
| 5,757,425 | A | * | 5/1998 | Barton et al. | ................ 348/241 |
| 6,987,530 | B2 | * | 1/2006 | McConica | ............... 348/208.6 |

* cited by examiner

*Primary Examiner*—Kanjibhai Patel (57) ABSTRACT

A method and device for generating image data are disclosed herein. One embodiment of the method comprises focusing an image of an object onto a two-dimensional photosensor array, wherein an optical element is located between the object and the two-dimensional photosensor array. The optical element is moved, wherein the moving causes the image focused on the two-dimensional photosensor array to move parallel to the two-dimensional photosensor array. Data representative of the image is generated by the two-dimensional photosensor array while the optical element is moving.

33 Claims, 7 Drawing Sheets

METHOD AND APPARATUS FOR GENERATING DATA REPRESENTATIVE OF AN IMAGE

BACKGROUND

Digital cameras and other digital imaging devices generate machine-readable image data (sometimes referred to simply as "image data") representative of images of objects. The process of generating image data representative of an image of an object is sometimes referred to as imaging or capturing an image of the object. During the imaging process, a digital camera forms an image of the object onto a two-dimensional photosensor array. The photosensor array has a plurality of discrete photodetector elements that are sometimes referred to as photodetectors. Each of the photodetectors generates an electrical signal having values proportional to the intensity of light incident on the photodetectors. The output of the photosensor array is connected to an analog-to-digital converter that is used to convert the electrical signals generated by the photodetectors into digital numbers. The digital numbers output from the analog-to-digital converter are proportional to the intensity of the light incident on the photodetectors. These digital numbers are sometimes referred to as counts or raw data. The raw data consists of numbers wherein a high number is typically representative of a photodetector that received bright light and a low number is typically representative of a photodetector that received dim light.

In color digital photography, color is typically generated using filters in a prescribed color-filter array pattern. A filter placed over the top of each photodetector limits the response of the photodetector so that the raw data produced is limited to a preselected wavelength of light. These preselected wavelengths of light typically correspond to the three additive primary wavelengths or colors of red, green, and blue. The raw data representative of three colors is processed to generate one pixel in the final image. One common type of color filter uses a Bayer pattern. The Bayer pattern is a four-pixel cluster that consists of a pixel that responds to red light, two pixels that respond to green light, and a pixel that responds to blue light.

Digital images are generated by sampling a continuous scene or object. The sampling process consists of mapping the scene onto to the two-dimensional grid of photodetectors that forms the photosensor array. Due to the discrete nature of the digital imaging process the image generated by a digital camera is subject to certain image anomalies resulting from the sampling process. One anomaly is aliasing, which is the generation of false frequencies when an image is undersampled. Aliasing becomes more apparent when an image of an object having high spatial frequency content is imaged.

The highest spatial frequency that may be replicated is one half the sampling frequency, which is referred to as the Nyquist frequency. Frequencies higher than the Nyquist frequency are aliased down to lower frequencies. The lower frequency features introduce artifacts into the image, which can create false images and form moiré patterns in periodic scenes. The anomalies are even greater if the digital camera is used to generate a video or movie images because the camera typically does not use all the photodetectors in the array. Thus, the sampling rate decreases and the effects due to aliasing increase.

SUMMARY

A method and device for generating image data are disclosed herein. One embodiment of the method comprises focusing an image of an object onto a two-dimensional photosensor array, wherein an optical element is located between the object and the two-dimensional photosensor array. The optical element is moved, wherein the moving causes the image focused on the two-dimensional photosensor array to move parallel to the two-dimensional photosensor array. Data representative of the image is generated by the two-dimensional photosensor array while the optical element is moving.

DETAILED DESCRIPTION

Figure 1:
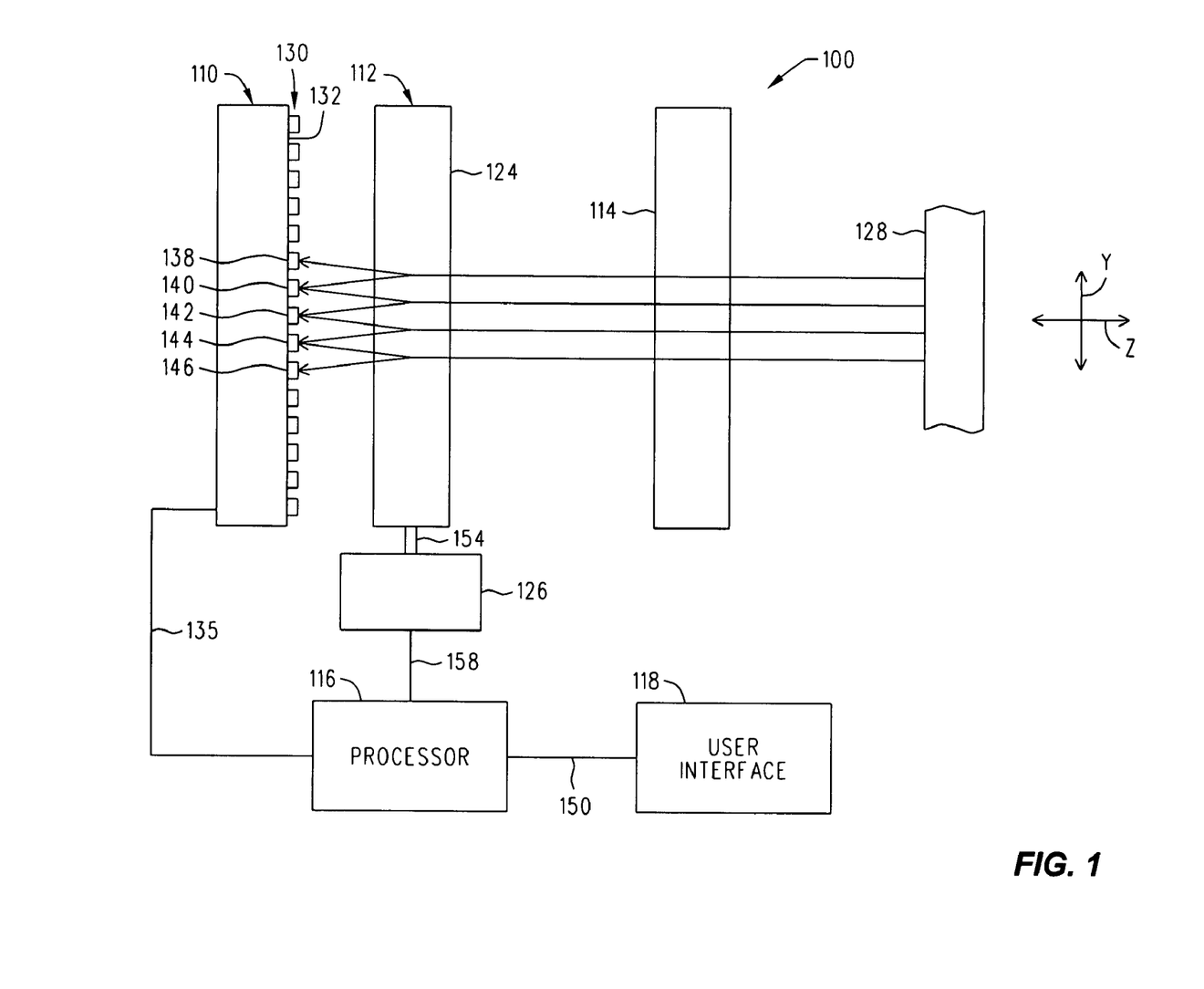
FIG. 1 is a schematic illustration of a side view of an embodiment of an imaging system.

A non-limiting embodiment of a block diagram of an imaging system 100 is shown in FIG. 1. The imaging system 100 may be one of many different types of digital imaging devices that generate machine-readable image data (referred to herein simply as image data) representative of an image of an object. The generation of image data representative of an image of an object is sometimes referred to as imaging an object or capturing an image of an object. For example, the imaging system 100 may be part of a scanner, a digital still camera, or a digital video camera. In the examples provided herein, the imaging system 100 is part of a digital camera that is primarily used to capture still images. The digital camera described herein may also have the ability to capture moving images to create movies or video images.

The imaging system 100 may include a photosensor array 110, a blur filter 112, a focusing lens 114, a processor 116, and a user interface 118. The blur filter 112 may include an optical element 124 and a motion device 126, wherein the motion device 126 serves to move the optical element 124. It should be noted that other components, not shown, generally associated with imaging systems may be included in the imaging system 100. For reference purposes, a coordinate system of x-directions, FIG. 2, y-directions, FIG. 1, and z-directions are used herein. The imaging system 100 of FIG. 1 is shown imaging or capturing an image of an object 128.

In summary, the imaging system 100 serves to generate image data representative of an image of an object, such as the object 128. The image of the object 128 is focused onto the photosensor array 110, which generates raw data. Raw data as used herein is data generated by the photosensor array 110. Image data, such as JPEG data, is generated by processing the raw data. The raw data consists of a plurality of samples of the image that are representative of the intensity of light in the image at sample points. The sample points may be photodetectors located on the photosensor array 110.

The generation of image data in a digital imaging device such as the imaging system 100 may be subject to aliasing, which distorts the image of the object 128 when it is replicated. Aliasing is due, in part, to undersampling of the image of the object. Undersampling, in turn, is due to the combination of the image of object having high spatial frequencies and the sampling rate being too low to sample the high spatial frequencies. In order to replicate an image, the sampling frequency must be at least twice the highest spatial frequency. This sampling frequency is referred to as the Nyquist frequency. Frequencies greater than the Nyquist frequency are aliased to lower frequencies, which introduce artifacts into the replicated image. The artifacts may create false images, form moire patterns in periodic scenes, and cause other anomalies in the replicated image.

The imaging system 100 described herein reduces aliasing by use of the blur filter 112. The blur filter 112 blurs the image of the object 128 during generation of the raw data, which in turn functions as a low-pass filter and attenuates high frequency components of the image. The blur in the imaging system 100 is achieved by the optical element 124 blurring the image, moving the optical element 124 during generation of the raw data, or a combination of both. When the optical element 124 is moved, the image of the object 128 is moved relative to the photosensor array 110. When the optical element is moved during generation of the raw data the raw data is representative of a blurred image having reduced spatial frequencies. The amount of movement or blur may be selected depending on the sampling rate used in the generation of the data. The sampling rate may be selected based on the Nyquist frequency and other principles. For example, if the imaging system 100 is used to generate image data representative of still images, a high degree or rate of sampling may be used, which results in little blur being required. As described in greater detail below, a greater amount of blur may be required in the generation of image data representative of movies or video images wherein a lower degree or rate of sampling is used.

Having summarily described the imaging system 100, it will now be described in greater detail.

Figure 2:
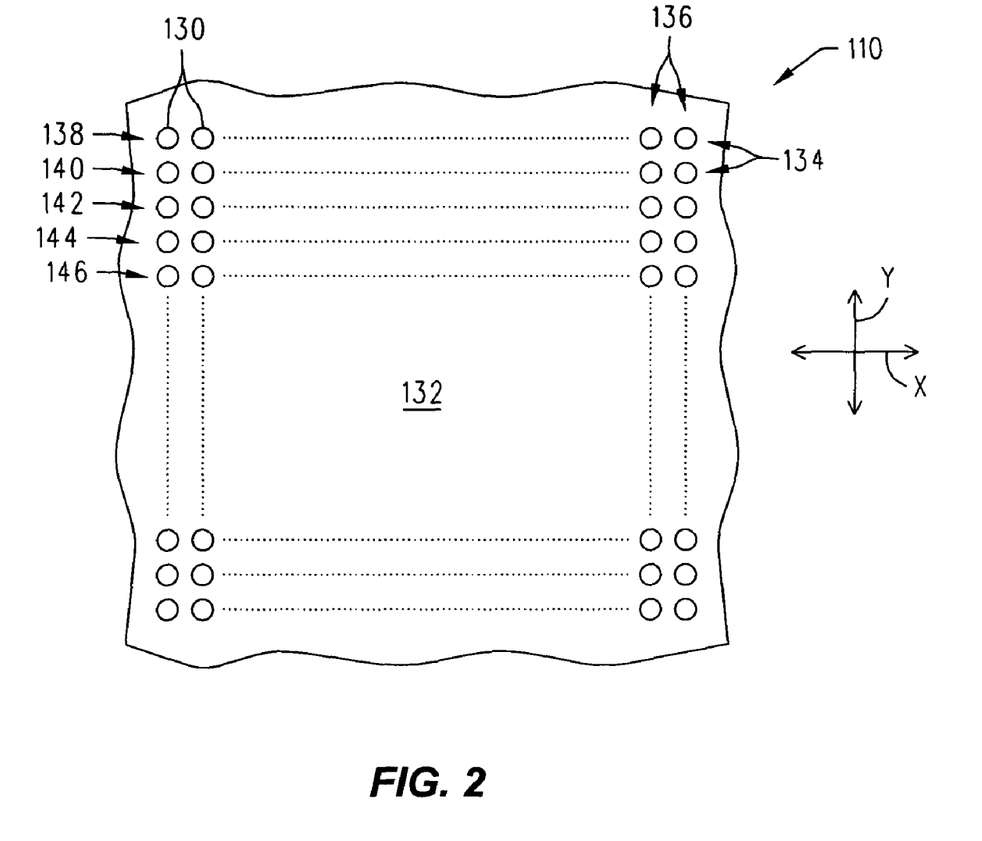
FIG. 2 is a schematic illustration of a front view of an embodiment of the photosensor array used in the imaging system of FIG. 1.

With additional reference to FIG. 2, which is a front view of the photosensor array 110, the photosensor array 110 may have a plurality of photodetectors 130 located on a front surface 132. For illustration purposes, the size of the photodetectors 130 have been greatly enlarged in the figures. A photodetector is typically only a few microns wide. In FIG. 1, the photodetectors 130 are illustrated as extending from the surface 132 of the photosensor array 110. However, it should be noted that the photodetectors 130 may be flush with the front surface 132 of the photosensor array 110 or even recessed therein.

The photodetectors 130 serve to convert light intensities to raw data, which may be electronic signals or numbers. For examples, a photodetector that receives a high intensity of light may generate raw data having a high number or value. Likewise, a photodetector that receives a low intensity of light may generate image data having a low number or value. The raw data may be transmitted to the processor 116 by way of a line 135. The line 135 and all other lines herein may be any device that transmits data or signals, such as serial or parallel data lines. The lines may use any medium to transmit data, such as wires, infrared, and radio transmissions.

Figure 3:
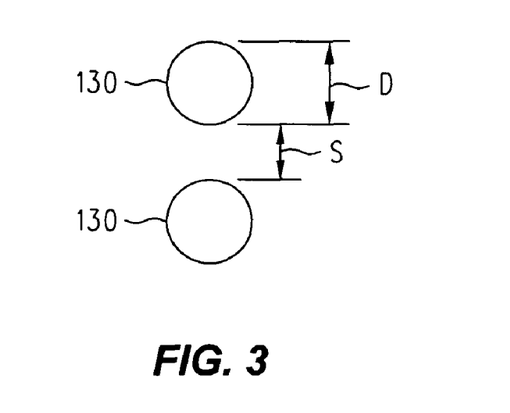
FIG. 3 is an enlarged view of two of the photodetectors on the photosensor of FIG. 2.

The photodetectors 130 are arranged into a plurality of rows 134 and columns 136. For reference, some of the rows 134 are referenced as the first row 138, the second row 140, the third row 142, the fourth row 144, and the fifth row 146. FIG. 3 is an enlarged view of two of the photodetectors 130 of FIG. 2 and serves to show the relationship between the photodetectors 130. As shown in FIG. 3, each of the photodetectors 130 may have a diameter D and the photodetectors 130 may be separated from each other by a distance S. The diameter D and the distance S may be only a few microns. Accordingly, the rows 134 of photodetectors 130 may be very close to one another or may abut one another.

Each of the photodetectors 130 may generate raw data based on the intensity of light received by each of the photodetectors 130. Photosensor arrays having photodetectors 130 with large diameters sample less portions of an image than photosensor arrays having photodetectors 130 with small diameters. Likewise, photosensor arrays having large distances between photodetectors 130 sample less light than photosensor arrays having smaller distances between the photodetectors 130. As briefly described above, the blur filter 112 serves to reduce the problems associated with low sampling rates by spreading or blurring the light from one portion of the image onto a plurality of photodetectors 130. Therefore, the spatial frequencies of the image being captured are reduced.

The photosensor array 110 may have several million photodetectors 130 located thereon. Each of the photodetectors 130 generates raw data representative of the intensity of light it receives. When the imaging system 100 is used to generate image data representative of still images, the imaging system 100 typically has time to process the raw data generated by all the photodetectors 130. In addition, the imaging system 100 typically has enough memory to store the resulting image data by use of electronic data storage devices, not shown. When raw data is being processed by all the photodetectors 130, the sampling rate of the image is relatively high. Therefore, images having relatively high spatial frequencies may be processed and the amount of blur or low-pass filtering required to be applied to the images is relatively low.

Even though the sampling rate is typically high when still images are imaged, some low-pass filtering may be required in order to reduce aliasing caused by high spatial frequency components of the images. For example, when an imaging system or device generates image data representative of still images, blur of one pixel or photodetector is typically used. One pixel blurring scatters light that would normally illuminate one photodetector or a group of photodetectors to the surrounding photodetectors. Thus, the low-pass filtering is achieved by way of slightly blurring the image.

When the imaging system 100 is used to generate image data representative of video images, the imaging system 100 may not have the processing speed or memory to process the raw data generated by all the photodetectors 130. In order to overcome this problem, raw data from fewer than all the photodetectors 130 is processed, which in effect, reduces the sampling rate and lowers the spatial frequencies that may be processed by the imaging system 100. For example, in one embodiment, the photosensor array 110 generates raw data at a rate of thirty images per second in order to generate a movie or video. In order to process this large amount of raw data, a substantial portion of the raw data may be disregarded or not generated at all.

In one embodiment of the imaging system 100, raw data from only every third row of the photodetectors 130 is processed or generated when the imaging system 100 is generating image data representative of video images. In an example of this embodiment, raw data generated by the first row 138 of photodetectors 130 and the fourth row 144 of photodetectors 130 may be processed. Data generated by the second row 140 and the third row 142 may be discarded or simply not generated by the photosensor array 110. Because fewer portions of the image or images are sampled, the sampling rate of the image is reduced. The lower sampling rate of the image results in the imaging system 100 having reduced abilities to process images having high spatial frequencies without the replicated images having the above-described anomalies.

When the above-described one pixel of blur is applied to the photosensor array 110 during the period that the photosensor array 110 generates raw data, aliasing may still occur due to the significantly lowered sampling rate. For example, if the object 128 is bright and is moving in the y-direction, raw data will only be generated during periods that its image is focused on every third row of photodetectors 130. If the object 128 is relatively large, only portions of the image that are focused on every third row of photodetectors 130 will be imaged. Upon replication of the video, the replicated image of the object 128 may appear to flash as it moves in the y-direction. The movement of the object 128 may also be improperly replicated as discreet movements rather than a smooth motion. This discreet movements are due to edges of the object 128 being imaged only by the rows 134 of photodetectors 130 that generate image data. In addition, replicated still images of vertical objects may appear roped. Roping is caused by the image data sampling along the y-direction being inconsistent or not meeting Nyquist criteria. In addition, artifacts may be introduced into the image and moire patterns may appear.

It should be noted that other imaging techniques may sample fewer than all the photodetectors 130. For example, raw data from various columns 136 of photodetectors 130 may not be generated or processed. In another example, raw data from various photodetectors 130 may not be generated or processed. These other imaging techniques will produce replicated images that may have anomalies similar to those described above. As described in greater detail below, the moving blur filter 112 described herein serves to overcome or reduce many of the above-described anomalies.

Having summarily described the photosensor array 110, other components of the imaging system 100 will now be described in greater detail. The photosensor array 110 may have a color filter, not explicitly shown, located adjacent the photodetectors 130. The color filter serves to filter light so that only light of preselected frequencies intersects specific photodetectors 130. The photodetectors 130 then generate raw data proportional to the intensity of the specific frequency components of light that passes through the color filter. The raw data representing different colors is combined and/or processed during replication of the image to reconstruct a color image. It should be noted that various demosaicing algorithms may be applied to the raw and image data in order to replicate the image of the object 128.

Figure 4:
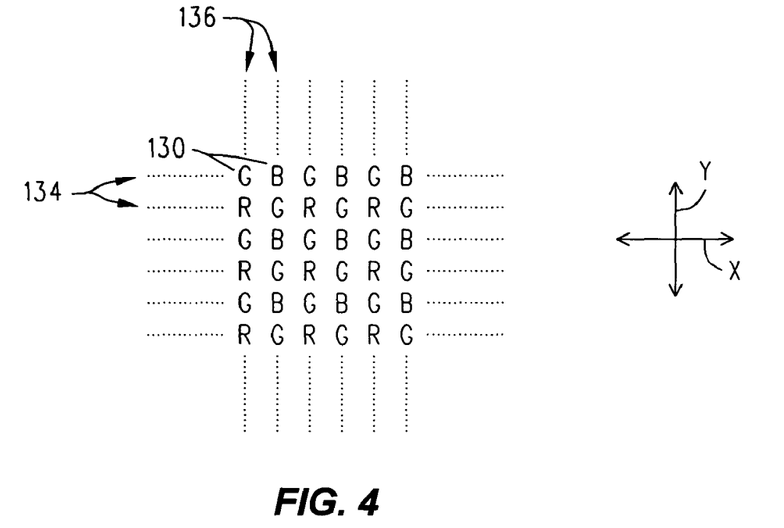
FIG. 4 is an illustration of a Bayer filter.

One embodiment of a color filter uses a Bayer pattern as shown in FIG. 4. The Bayer pattern can be considered to arrange the photodetectors 130, FIG. 3, into groups or tiles of four photodetectors 130, wherein there are two green photodetectors (designated by the letter 'G') for every one red photodetector (designated by the letter 'R') and one blue photodetector (designated by the letter 'B'). The raw data generated by the groups of four photodetectors is combined during processing to create a single picture element or pixel of the replicated image. The use of a color filter further decreases the sampling rate of the photosensor array 110 by reducing the number of photodetectors that generate image data representative of the object. More specifically, the color filter causes the image to be divided into specific spectral components wherein specific photodetectors generate image data of preselected spectral components. Thus, the number of photodetectors that generate image data representative of the whole image is effectively reduced.

Referring again to FIG. 1, the focusing lens 114 serves to focus an image of the object 128 onto the photodetectors 130. The focusing lens 114 is shown in FIG. 1 as a being a single optical element. The focusing lens 114, however, may be a plurality of lenses commonly used in digital imaging devices. In one embodiment of the imaging system 100, the focusing lens 114 moves in the z-direction in order to enlarge or decrease the size of the image focused onto the photosensor array 110. Thus, the focusing lens may provide for a zoom feature of the imaging system 100 in addition to focusing a sharp image of the object 128 onto the photodetectors 130.

The processor 116 serves to process raw data generated by the photosensor array 110. The processor 116 may transform the raw data generated by the photosensor array 110 into formats commonly used by replication devices such as video monitors and printers. The processor 116 may also analyze the raw data to determine the spatial frequency of the image of the object 128 as represented by the raw data or the processed image data. As described in greater detail below, the spatial frequency of the raw data is a factor in determining the amount of blur the blur filter 112 creates by moving the optical element 124. With respect to blur, the processor 116 may also control the movement of the optical element 124 via the motion device 126, which is also described in greater detail below.

The user interface 118 may be connected to the processor 116 by a line 150. The user interface 118 serves to enable the user of the imaging system 100 to input data concerning the image for which image data is being generated. For example, the user may input information regarding a desired sampling rate or blur to be applied during generation of the image data. There are many different methods and devices for providing the user interface 118. For example, the user interface 118 may have switches that may be activated by the user. In another example, the imaging system 100 may have a touch screen, not shown, wherein the user interface 118 is associated with the touch screen.

Figure 5:
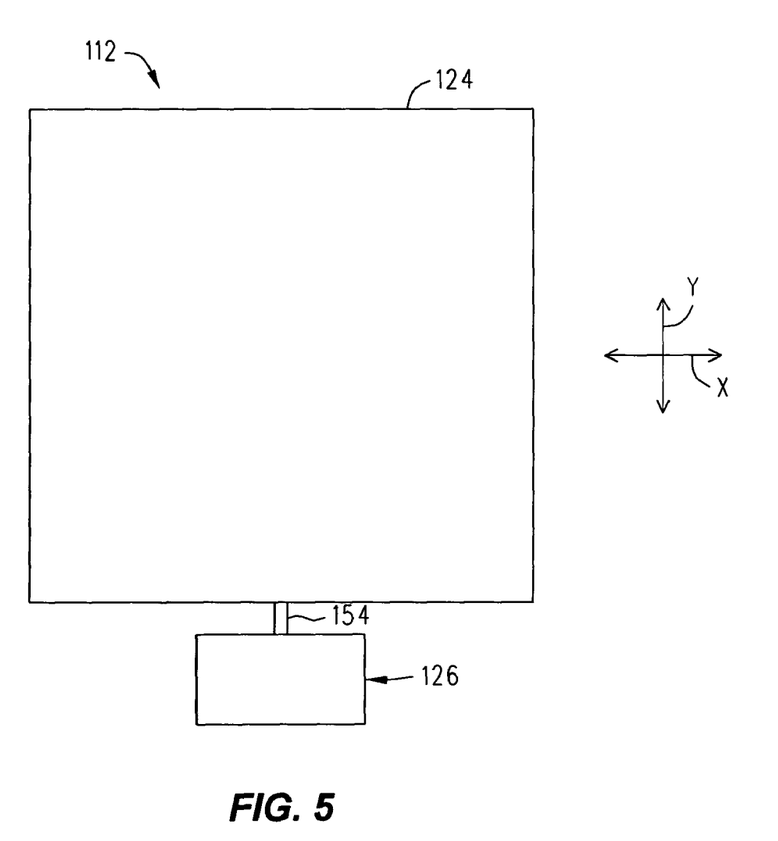
FIG. 5 is a front view of an embodiment of the blur filter of FIG. 1.

Having described some of the components of the imaging system 100, the blur filter 112 will now be described in greater detail. In summary, the blur filter 112 serves to blur the image of the object 128 so as to attenuate high spatial frequency components of the image of the object 128, which in turn reduces some anomalies associated with digital imaging. A front view of an embodiment of the blur filter 112 is shown in FIG. 5 and a side view of the blur filter 112 is shown in FIG. 1. The blur filter 112 includes the optical element 124, which is connected to the motion device 126 by way of a connector 154. The connector 154 may be part of the motion device 126 and may, as an example, be adhered to the optical element 124. The motion device 126 is connected to the processor 116 by way of a line 158. As briefly described above, the processor 116 may control the motion generated by the motion device 126.

The motion device 126 is a device that moves the optical element 124. In the embodiment of the imaging system 100, FIG. 1, described above, the motion device 126 moves the optical element 124 in the y-direction. Other embodiments of the motion device 126 described below may move the optical element 124 in the x-direction or the y-direction. Some embodiments of the motion device 126 may also rotate or pivot the optical element 124. Some other embodiments of the motion device 126 may also move the optical element in a combination of directions. The motion device 126 may use, as examples, piezoelectric devices or electromechanical devices, to move the optical element 124.

Figure 6:
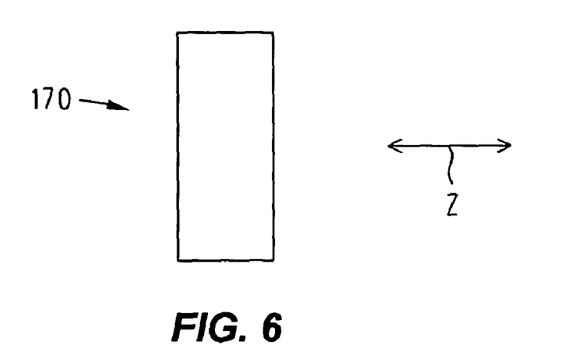
FIG. 6 is an embodiment of the optical element of FIG. 1 being a dithered optically transparent plate.

Examples of the optical element 124 are shown in FIGS. 6-10. The optical element of FIG. 6 is a dithered, optically-transparent plate 170. With additional reference to FIG. 1, the motion device 126 may cause the dithered, optically-transparent plate 170 to move along the z axis. This movement causes an image of the object 128 focused onto the photosensor array 110 to be blurred along both the x and y axes, FIG. 2.

Figure 7:
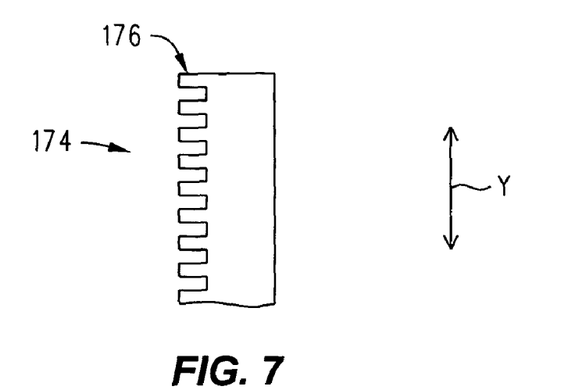
FIG. 7 is an embodiment of the optical element of FIG. 1 being a dithered grating.

FIG. 7, shows an example of the optical element being a dithered grating 174. The dithered grating 174 may have a dithered portion 176 that may face the photosensor array 110 of FIG. 1. In one embodiment, the motion device 126, FIG. 1, may cause the dithered grating 174 to move along the y axis, which will cause an image of the object 128 to be blurred along the y axis relative to the photosensor array 110.

Figure 8:
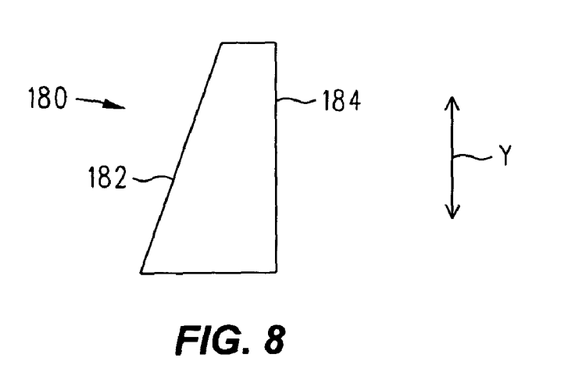
FIG. 8 is an embodiment of the optical element of FIG. 1 being a translated wedge.

FIG. 8, shows an example of the optical element being a translated wedge 180. The translated wedge 180 may have a first surface 182 and a second surface 184 that are not parallel to each other. Either the first surface 182 or the second surface 184 may face the photosensor array 110 of FIG. 1. In one embodiment, the motion device 126 may cause the translated wedge 180 to move along the y axis, which will cause an image of the object 128 to be blurred along the y axis relative to the photosensor array 110.

Figure 9:
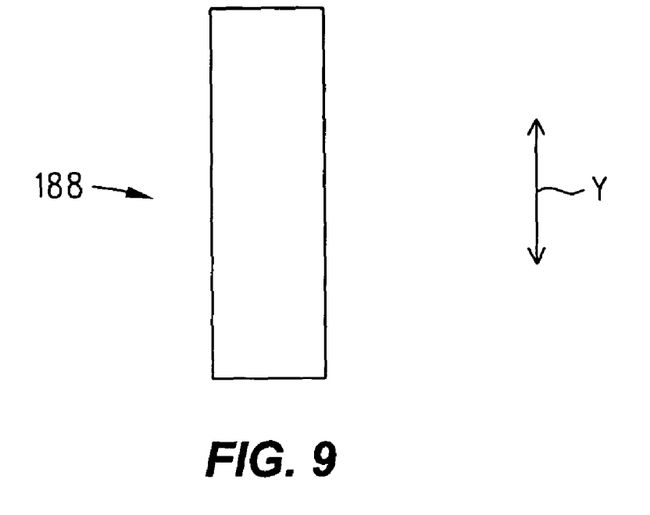
FIG. 9 is an embodiment of the optical element of FIG. 1 being a translated ground-glass plate.
Figure 10:
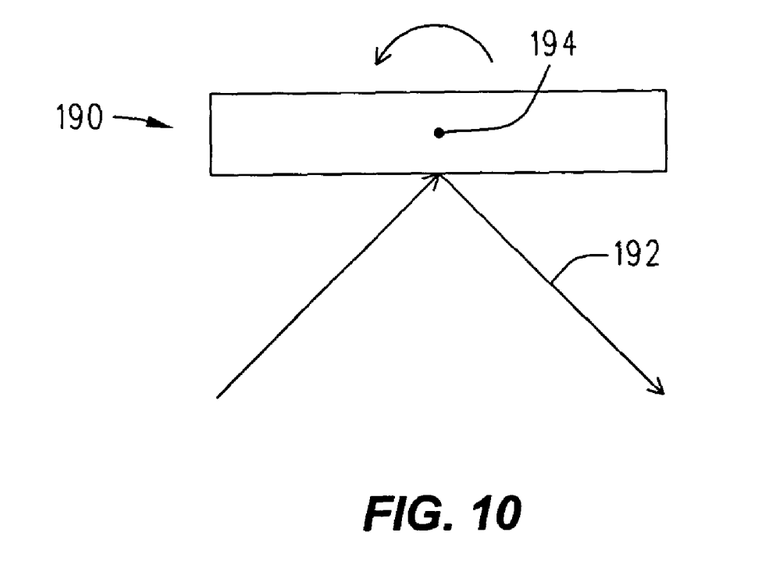
FIG. 10 is an embodiment of the optical element of FIG. 1 being a mirror.

FIG. 9 shows a translated, ground-glass plate 188 that may be moved along the y axis to blur an image. FIG. 10 shows a mirror 190 used to blur an image. A light path 192 may reflect from the mirror 190 as the mirror 190 pivots about a pivot point 194. The pivoting causes the light path 192 to move so as to blur the image. The pivoting may enable the mirror 190 to cause blurring in a plurality of different directions. For example, the mirror may pivot about a two axes (not shown).

Referring again to FIG. 1 and as described herein, the blur of the image of the object 128 is achieved by moving the optical element 124. However, additional blur may be achieved by using an optical element 124 that blurs without being moved. For example, the material of the optical element 124 may be a birefrigant quartz element or a phase-noise blur filter. In these examples of the optical element 124, some of the blur is preselected depending on the material used in the construction of the optical element 124. Additional blur may be provided for the imaging system 100 by moving the optical element 124 during generation of raw data as described herein.

Having described the structure of the imaging system 100, the operation of the imaging system 100 will now be described.

The embodiment of imaging system 100 described herein has two modes. A first mode, sometimes referred to as a still mode, generates still images and a second mode, sometimes referred to as a video mode, generates video images. During generation of still images, the imaging system 100 may use raw data generated by all the photodetectors 130. In such a situation, the sampling rate is high. Therefore, very little blur is required to attenuate the effects of aliasing in images containing high frequency components. In some embodiments described below, differing amounts of blur are used depending on the spatial frequency content of the image.

Movies or video images, on the other hand, typically do not use raw data generated by all the photodetectors 130. Use of all the photodetectors 130 is very time consuming and typically uses more memory than is practical. For example, generation of raw data for video images typically requires that the photosensor array 110 generate raw data representative of thirty images or frames every second. If all the photodetectors 130 were used in this process, most practical portable memory devices used in still cameras would be quickly overwhelmed.

With additional reference to FIG. 4, raw data representative of video images is typically generated by using less than all the rows 134 of photodetectors 130. For example, every third row 134 of photodetectors 130 may generate raw data that is to be processed. Use of every third row uses only one third of the photodetectors 130 on the photosensor array 110, but maintains the Bayer pattern with regard to the color filter. If raw data is generated by the other rows 134, it may be deleted or disregarded during processing. In either event, the raw data generated by these rows may not be stored and, therefore, does not occupy memory or increase the processing time.

As described above, the use of less than all the photodetectors 130 degrades the quality of the replicated image by reducing the sampling rate when the raw data is generated. In order to reduce the image degradation, the image is blurred on the photosensor array 110. The amount of blurring, direction in which the blur occurs, and the speed of the blur is sometimes cumulatively referred to as the blur profile. Several blur profiles in addition to the ones described herein may be applied to the image.

Figure 11:
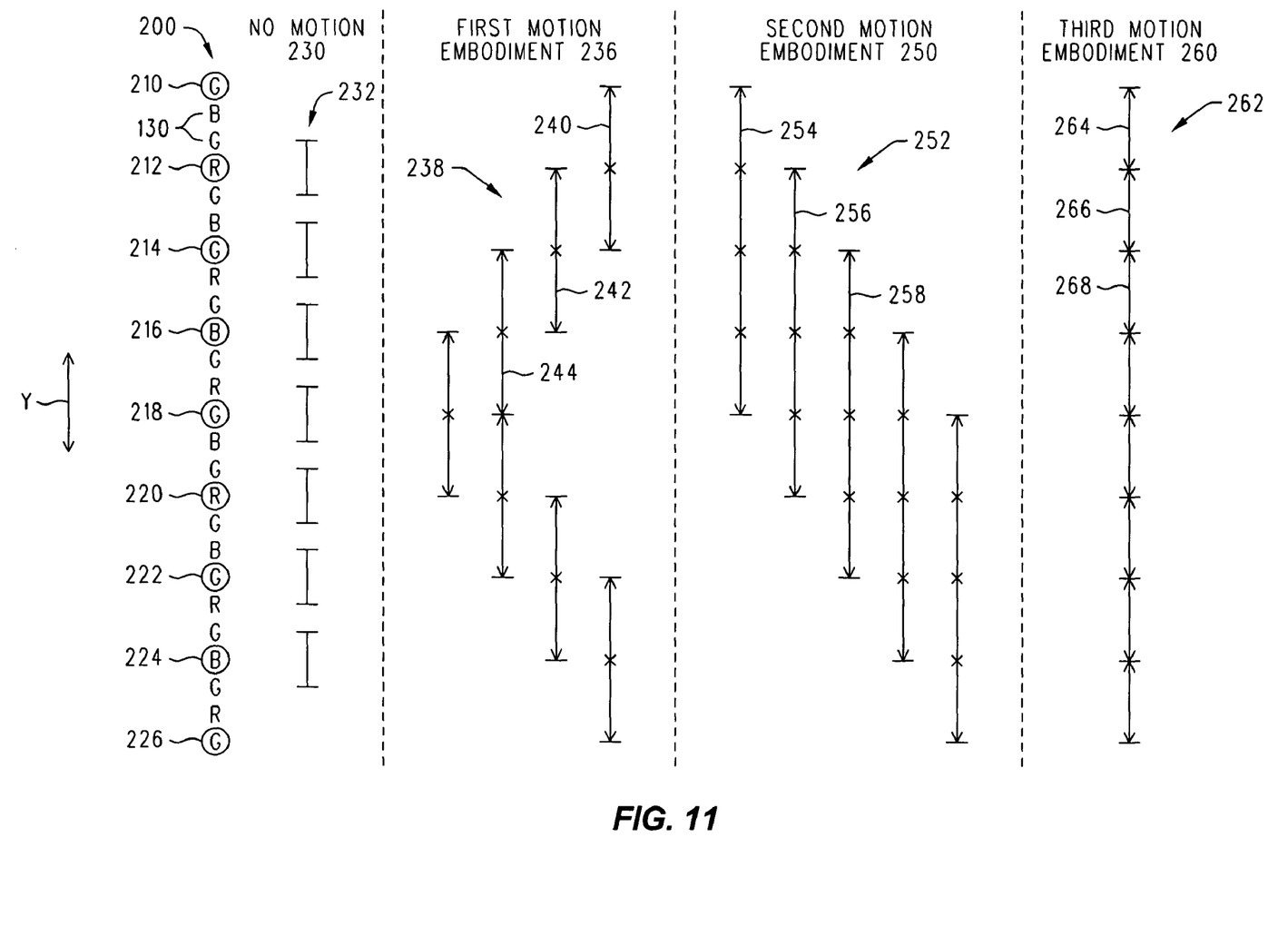
FIG. 11 is an embodiment of blur profiles generated in the Y direction.

Some examples of blur profiles are illustrated in FIG. 11. For illustration purposes, the blur profiles of FIG. 11 are shown relative to a column of photodetectors 200 extending in the Y direction. The column of photodetectors 200 represents a column 136, FIG. 4, of the above-described Bayer pattern. As described above, when the imaging system 100, FIG. 1 is in a video mode, the photosensor array 110 may only process every third row of photodetectors 130. The photodetectors 130 in the column of photodetectors 200 that may be processed in the video mode are circled and are referred to as the active photodetectors. The active photodetectors are referenced as a green photodetector 210, a red photodetector 212, a green photodetector 214, a blue photodetector 216, a green photodetector 218, a red photodetector 220, a green photodetector 222, a blue photodetector 224, and a green photodetector 226.

One of the embodiments shown in FIG. 11 is a no motion embodiment 230 where no motion blur is applied to the image. In the no motion embodiment 230, the optical element 124, FIG. 1, remains stationary relative to the photosensor array 110 during generation of the raw data. In the embodiment described herein, the optical element 124 is a blur filter. Therefore, some blurring of the image does occur, however as described herein, the blurring may not be enough to improve the quality of video images and is used primarily in generating raw data representative of still images. The plurality of lines 232 are representative of the areas of the photosensor array 110 that are illuminated for a particular blur profile during generation of the raw data. In addition, the lines 232 indicate the photodetectors 130 that receive light for the different blur profiles. For example, light directed to the red photodetector 212 is blurred so as to also intersect its surrounding green photodetectors. These green photodetectors, however, do not generate raw data that is processed when the imaging system 100, FIG. 1, is in the video mode. Likewise, light directed to the green photodetector 214 is blurred to also intersect its surrounding blue and red photodetectors, which do not generate raw data when the imaging system 100, FIG. 1, is in the video mode.

With the limited blurring provided by the no motion embodiment 230, replicated video images may be distorted. For example, if an object having a high blue color content moves in the Y direction, it will only be imaged by approximately every tenth photodetector. More specifically, as the blue object (or an edge of the blue object) moves in the Y direction, it will be imaged by the blue photodetector 216 when it is in such a position. As it continues past the blue photodetector 216, it will not be imaged again until it is in a position to be imaged by the blue photodetector 224. The blue object will appear to jump from one position to another when the replicated video is played.

Another problem occurs with a moving object (or an edge of an object) that has a combination of many color components. When the object is located so that the blue photodetector 216 may image the object, only the blue component of the object will be imaged. As the object moves toward a position where the green photodetector 218 images the object, only the green component is imaged. As this process continues, the image data generated by the image of the object, or the edge of the object, will change color as the object moves. The replicated video will display an object that changes color as it moves.

As described above, the optical element 124, FIG. 1, of the imaging system 100 moves as raw data is being generated in order to reduce the aforementioned problems. One embodiment of the movement of the optical element 124 is illustrated as the first motion embodiment 236. In the first motion embodiment 236, the optical element 124 causes light reflected from a single point to move between three active photodetectors 130 during the period that raw data is being generated. The amount in which light moves between the photodetectors 130 is one of the factors that determines the blur profile. The blur profile may also include the speed at which the movement occurs.

A plurality of lines 238 illustrate the blurring in the Y direction caused by the optical element 124. For example, a first line 240 illustrates the blurring associated with light that would otherwise be solely incident to the red photodetector 212. The light that would be incident to a specific photodetector is indicated by an x. As shown, the first motion embodiment 236 cause the light is blurred between the green photodetector 210 and the green photodetector 214. Therefore, light that would otherwise only have its red component imaged also has its green component imaged. As described in greater detail below, the amount of green to red imaging may be selected by other factors in the blur profile. For example, the speed of the motion blur and the time the light spends on each active photodetector affects the blur profile.

A second line 242 illustrates the blurring associated with light that would otherwise be solely incident to the green photodetector 214. As shown, the first motion embodiment 236 causes light that would otherwise be solely incident to the green photodetector 214 to be incident also with the red photodetector 212 and the blue photodetector 216. Therefore, light that would otherwise only have its green components imaged also has its blue and red components imaged.

A third line 244 illustrates the blurring associated with light that would otherwise be solely incident to the blue photodetector 216. As shown, the first motion embodiment 236 causes light that would otherwise be solely incident to the blue photodetector 216 to be incident also with the green photodetector 214 and the green photodetector 218. Therefore, light that would otherwise only have its blue components imaged also has its green and red components imaged.

The first motion embodiment 236 provides for continual imaging of an object by enabling all portions of the image of the object to be continually incident with the photodetectors 130 even as the object moves. Thus, the replicated image of the object will be less likely to disappear and later reappear than it would be without the motion blur. In addition, the color components of the image of the object are more continually imaged than they would without the motion blur. Therefore, the replicated image of the object will be less likely to change color as it moves than it would be without the motion blur. It should be noted that with the first motion embodiment 236, the blue and red color components of the replicated image may vary slightly because they are not necessarily continually imaged. The green component, however, will be more constant.

It should be noted that the Bayer color filter has twice as many green photodetectors as red and blue photodetectors. The first motion embodiment 236, however, may cause the green photodetectors to receive an even greater proportion of light than without the motion. In order to remedy the increase in light received by the green photodetectors, the data values associated with the green photodetectors may be decreased during image processing. For example, the raw data generated by the green photodetectors may be scaled down in order to compensate for higher values associated with the increased proportion of light they receive.

A second motion embodiment 250 is also shown in FIG. 11. The second motion embodiment 250 is similar to the first motion embodiment 236, however, the blur profile causes a higher degree of motion than the first motion embodiment 236. The second motion embodiment 250 is illustrated by a plurality of lines 252. The plurality of lines 252 include a first line 254, a second line 256, and a third line 258. As with the lines 238, the lines 252 represent the amount and direction of blur provided by the second motion embodiment 250.

With regard to the first line 254, light that would otherwise only be imaged by the green photodetector 214 is also imaged by the green photodetector 210, the red photodetector 212, the blue photodetector 216, and the green photodetector 218. Therefore, light that would normally only be imaged by the green photodetector 214 is also imaged by red and blue photodetectors. Thus, the full spectrum of light incident to the green photodetector 214 may be imaged. With regard to the second line 256, light that would otherwise only be imaged by the blue photodetector 216 is also imaged by the red photodetector 212, the green photodetector 214, the green photodetector 218, and the red photodetector 220. Again, light that would otherwise only be imaged by the blue photodetector 216 has its full spectrum imaged. With regard to the third line 258, light that would otherwise be image only by the green photodetector 218 is also imaged by the green photodetector 214, the blue photodetector 216, the red photodetector 220, and the green photodetector 222. As with the aforementioned examples, the light that would otherwise only have its green color component imaged has all its color components imaged.

The second motion embodiment 250 provides for more inclusive spectral imaging of an object by having light imaged by more of the photodetectors 130. More specifically, light incident to any of the active photodetectors 130 will have all its color components imaged. As with the first motion embodiment 236 the pixel values generated by the photodetectors 130 may have to be scaled to compensate for varying intensities of light that intersect red, green, and blue photodetectors caused by the second motion embodiment 250. While the proportion of red, green, and blue photodetectors imaging an object may remain the same as with the Bayer pattern, the speed at which the blur occurs and other blur profile characteristics may require scaling of the raw data values.

In practice, the second motion embodiment 250 improves the imaging of the color components of an object. This results in the colors of the object being more accurately imaged and maintained even as the object moves. Therefore, color transitions of an image of an object will remain relatively constant, even as the object moves. In addition, the colors of the image of the object not in the vicinity of color transitions will remain constant because of the imaging of all the color components of the object. The second motion embodiment 250, however, may cause the image of the object to be less detailed than other imaging techniques. In an embodiment described below, the amount of blur is selected based on the image of the object, so as to provide the sharpest possible image while maintaining color consistency.

FIG. 11 also shows a third motion embodiment 260 that blurs less than the first motion embodiment 236 and the second motion embodiment 250. A plurality of short lines 262 represent the blur of the third motion embodiment 260. The lines 262 include a first line 264, a second line 266, and a third line 268.

With regard to the first line 264, light that would otherwise be incident to the green photodetector 210, the red photodetector 212, or photodetectors 130 located therebetween, is imaged by both the green photodetector 210 and the red photodetector 212. With regard to the second line 266, light that would otherwise be incident to the red photodetector 212, the green photodetector 214, or photodetectors 130 located therebetween, is imaged by both the red photodetector 212 and the green photodetector 214. With regard to the third line 268, light that would otherwise be incident to the green photodetector 214, the blue photodetector 216, or a photodetectors 130 located therebetween, is imaged by both the green photodetector 214 and the blue photodetector 216.

The third motion embodiment 260 provides minimal blurring, but even this minimal blurring may be enough to greatly improve some images. For example, an image having relatively low spatial frequencies may only need slight blurring in order to reduce the effects associated with aliasing. In such a situation, the third motion embodiment 260 may be used.

Having described some embodiments of the amount of movement of the optical element 124, FIG. 1, some embodiment of the velocities of the optical element 124 will now be described.

In one embodiment of the imaging system 100, FIG. 1, the optical element 124 moves incrementally. Thus, beams of light passing through the optical element 124 are blurred incrementally relative to the photosensor array 110. The incremental movement may slow down when beams of light are incident with active photodetectors 130 and may speed up when the beams of light are incident with inactive photodetectors 130. This incremental blurring be achieved by changing the speed of the optical element 124 during its movement cycle as described in greater detail below.

Figure 12:
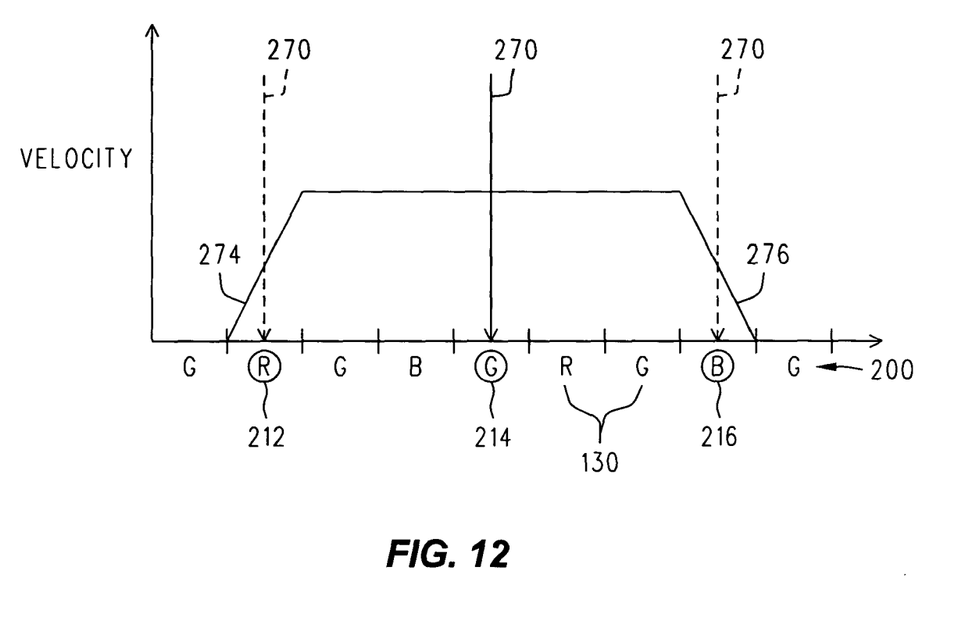
FIG. 12 is an embodiment of the blur velocity associated with the embodiment of FIG. 11.

A graph showing an embodiment of an incremental velocity of the optical element 124 of FIG. 1 used in conjunction with the first motion embodiment 236, FIG. 11, is shown in FIG. 12. The graph illustrates the second line 242 of FIG. 11, which blurs a beam of light 270 that would otherwise be incident solely with the green photodetector 214. The beam of light 270 is blurred so that it is incident with photodetectors 130 extending between the red photodetector 212 and the blue photodetector 216 as shown in FIG. 12. Thus, the graph of FIG. 12 shows the velocity of the movement of the beam of light 270 as it moves between the red photodetector 212 and the blue photodetector 216.

As the beam of light moves back and forth between the red photodetector 212 and the blue photodetector 216 it must stop to change directions. The change in directions causes the beam of light to slow down relative to the photosensor array 110, FIG. 1, which is indicated by the slopes 274 and 276 in the graph. When the beam of light slows down, it becomes incident on a photodetector for a longer period, which results in the photodetector imaging the beam of light for a longer period. With respect to the graph of FIG. 12, the red photodetector 212 and the blue photodetector 216 may image more of the beam of light 270 than the green photodetector 214 because of the time spent by the green photodetector 214 slowing down and changing direction. The values of the raw data generated by the photodetectors 130 may be scaled to compensate for the above-described different imaging times.

Figure 13:
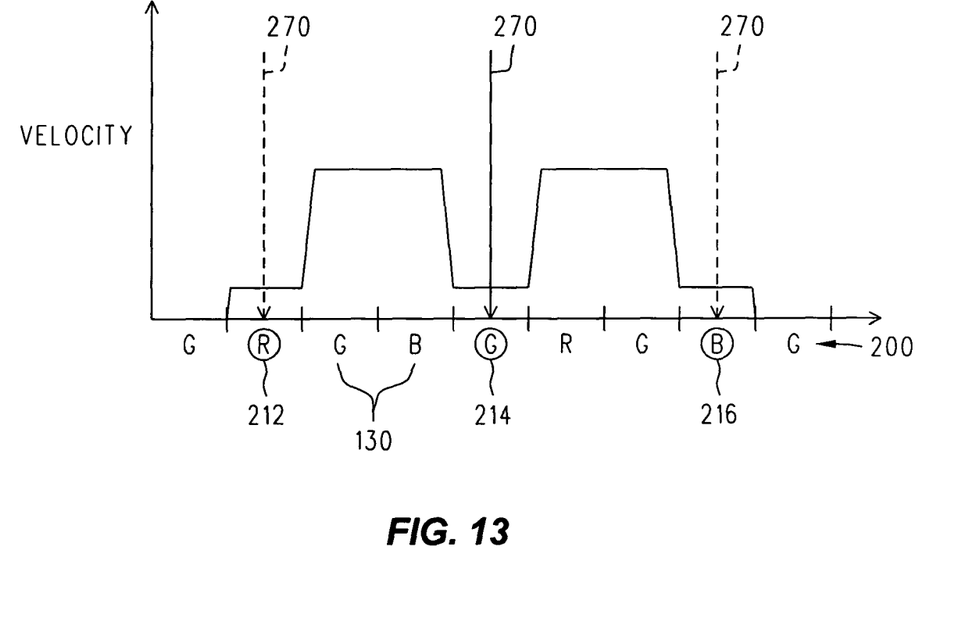
FIG. 13 is an embodiment of the blur velocity associated with the embodiment of FIG. 11.

Another example of moving the beam of light 270 is shown by the graph of FIG. 13. The embodiment of FIG. 13 uses faster acceleration and deceleration of the movement of the beam of light 270 than the embodiment of FIG. 12. In addition, the movement of the beam of light 270 is slowed when it is in the vicinity of the green photodetector 214. This embodiment enables the beam of light 270 to image the active photodetectors 130 for the same amount of time. Therefore, the raw data produced by the photodetectors 130 may require less scaling or more predictable scaling.

Having described some embodiments of the amount and velocity of the blur, which are collectively referred to as the blur profile, selection of the blur profile will now be described. Referring to FIG. 1, in one embodiment of the imaging system 100, the processor 116 analyzes raw data produced by the photodetectors 130 and selects the blur profile accordingly. In another embodiment of the imaging system 100, a user selects the blur profile by way of the user interface 118.

Selection of the blur profile may depend on whether the imaging system 100 is in a mode for generating image data representative of still images or video images. As described above, the imaging system 100 typically does not use all the photodetectors 130 during the generation of image data representative of video images. Therefore, the blur may be increased in order to compensate for the reduction in the sampling of the images. In one embodiment of the imaging system 100, the blur is automatically increased when the imaging system 100 is used to generate image data representative of video images. Likewise, the blur may be automatically reduced when the imaging system 100 is used to generate image data representative of still images.

In another embodiment of the imaging system 100, the amount of blur is determined by analyzing the image of the object 128 prior to capturing the image. For example, the spatial frequencies of the image may be analyzed. When an image is determined to have high spatial frequencies, the amount of blur may be increased or set to a preselected high value prior to capturing the image. Likewise, when an image is determined to have low spatial frequencies, the amount of blur may be decreased or set to a preselected low value prior to capturing the image.

In another embodiment of the imaging system 100, a user of the imaging system 100 may adjust the amount of blur. In one such embodiment, the user may adjust the blur depending on the object being imaged. For example, a user may decide to increase or decrease blur depending on experience and personal preference. In another such embodiment, the imaging system 100 may display the image that is to be captured. The user may then adjust the blur and see the effects on the image as the blur is being adjusted. Therefore, the user may select a desired blur profile after reviewing several blur profiles.

What is claimed is:

1. A method of generating data representative of an image, said method comprising:
    focusing an image of an object onto a two-dimensional photosensor array using a lens, wherein an optical element is located between said object and said two-dimensional photosensor array;
    moving said optical element, wherein said moving causes said image focused on said two-dimensional photosensor array to move; and
    generating data representative of said image using said two-dimensional photosensor array while said optical element is moving, wherein
    said moving comprises moving said optical element a first amount if said generating data comprises generating data representative of a still image, and wherein said moving comprises moving said optical element a second amount if said generating data comprises generating data representative of video images, wherein said first amount is less than said second amount.

2. The method of claim 1, wherein said moving comprises moving said optical element if said generating data comprises generating data representative of moving images.

3. The method of claim 1, wherein said two-dimensional photosensor array has a first number of photodetectors located thereon and wherein said generating data comprises generating data using a second number of photodetectors of said two-dimensional photosensor array while said optical element is moving, said second number being less than said first number.

4. The method of claim 3, wherein said moving comprises moving said optical element an amount so that a portion of said image intersects at least a first and at least a second of the photodetectors that generate data during the period that said two-dimensional photosensor array generates data.

5. The method of claim 1, wherein said two-dimensional photosensor array comprises a plurality of rows of photodetectors, wherein a first row of photodetectors and a second row of photodetectors generate data, wherein at least one row of photodetectors is located between said first row and said second row, and wherein said moving comprises moving said optical element so that at least a portion of said image is focused on said first row of photodetectors and said second row of photodetectors while said two-dimensional photosensor array generates data.

6. The method of claim 5, wherein said two-dimensional photosensor array further comprises a third row of photodetectors that generate image data, and wherein said moving comprises moving said optical element so that at least a portion of said image is focused on said first row of photodetectors, said second row of photodetectors, and said third row of photodetectors while said data is being generated.

7. The method of claim 1, wherein said moving further comprises moving said optical element at a first velocity when a portion of said image is focused on a first photodetector and moving said optical element at a second velocity when said portion of said image is focused on a second photodetector.

8. The method of claim 7, wherein said first photodetector generates data and said second photodetector does not generate data and wherein said first velocity is slower than said second velocity.

9. The method of claim 1, wherein said optical element comprises a dithered optically transparent plate.

10. The method of claim 9, wherein said moving comprises moving said dithered optically transparent plate in a direction substantially normal to said two-dimensional photosensor array.

11. The method of claim 1, wherein said optical element comprises a dithered grating.

12. The method of claim 11, wherein said moving comprises moving said dithered grating in a direction substantially parallel to said two-dimensional photosensor array.

13. The method of claim 1, wherein said optical element comprises a translated wedge.

14. The method of claim 13, wherein said moving comprises moving said translated wedge in a direction substantially parallel to said two-dimensional photosensor array.

15. The method of claim 1, wherein said optical element comprises a translated ground-glass plate.

16. The method of claim 15, wherein said moving comprises moving said translated ground-glass plate in a direction substantially normal to said two-dimensional photosensor array.

17. The method of claim 1, wherein said optical element comprises a mirror.

18. The method of claim 17, wherein said moving comprises pivoting said mirror relative to said two-dimensional photosensor array.

19. An imaging device comprising:
    a two-dimensional photosensor array, wherein data representative of an image focused onto said two-dimensional photosensor array is generatable by said two-dimensional photosensor array;
    a light path extending from a point not proximate said two-dimensional photosensor array to said two-dimensional photosensor array;
    a lens located in said light path; and
    an optical element located in said light path, said optical element being movable relative to said two-dimensional photosensor array; said movable optical element being movable during a period when said two-dimensional photosensor array generates data; wherein
    movement of said optical element causes said light path to move relative to said two-dimensional photosensor array, wherein
    said two-dimensional photosensor array comprises of a first number of photodetectors, wherein said imaging device has a first operative mode when data is generatable by said first number of photodetectors; wherein said imaging device has a second operative mode when image data is generatable by a second number of photodetectors; and wherein said first number is greater than said second number.

20. The imaging device of claim 19:

wherein said two-dimensional photosensor array comprises a first row of photodetectors, a second row of photodetectors, and at least one row of photodetectors located between said first row of photodetectors and said second row of photodetectors;

wherein said first row of photodetectors and said second row of photodetectors generate image data;

and wherein said optical element is movable so that a portion of an image is focusable on said first row of photodetectors and said second row of photodetectors when said two-dimensional array photosensor generates data.

21. The imaging device of claim 19 and further comprising a piezoelectric device operatively connected to said optical element.

22. The imaging device of claim 19, wherein said optical element is pivotable relative to said two-dimensional photosensor array.

23. The imaging device of claim 19, wherein said optical element comprises a dithered optically transparent plate.

24. The imaging device of claim 23, wherein said dithered optically transparent plate is movable in a direction substantially normal to said two-dimensional photosensor army.

25. The imaging device of claim 19, wherein said optical element comprises a dithered grating.

26. The imaging device of claim 25, wherein said dithered grating is movable in a direction substantially parallel to said two-dimensional photosensor array.

27. The imaging device of claim 19, wherein said optical element comprises a translated wedge.

28. The imaging device of claim 27, wherein said translated wedge is movable in a direction substantially parallel to said two-dimensional photosensor array.

29. The imaging device of claim 19, wherein said optical element comprises a translated ground-glass plate.

30. The imaging device of claim 29, wherein said translated ground-glass plate is movable in a direction substantially normal to said two-dimensional photosensor array.

31. The imaging device of claim 19, wherein said optical element comprises a mirror.

32. The imaging device of claim 31, wherein said moving said mirror is pivotable relative to said two-dimensional photosensor array.

33. An imaging device comprising:

a photosensing means for generating data representative of an image focused onto said photosensing means;

a focusing means for focusing said image onto said photosensing means; and a movement means for moving said image focused onto said photosensing means when said photosensing means is generating data, wherein said movement means comprises a blurring means connected to a movement device and wherein said blurring means is located proximate said photosensing means.

* * * * *

UNITED STATES PATENT AND TRADEMARK OFFICE
CERTIFICATE OF CORRECTION

PATENT NO. : 7,266,248 B2  Page 1 of 1
APPLICATION NO. : 10/637956
DATED : September 4, 2007
INVENTOR(S) : Kevin J. Matherson et al.

It is certified that error appears in the above-identified patent and that said Letters Patent is hereby corrected as shown below:

In column 15, line 31, in Claim 24, delete "army" and insert -- array --, therefor.

Signed and Sealed this

Twelfth Day of August, 2008

JON W. DUDAS
*Director of the United States Patent and Trademark Office*